(12) United States Patent
Lee

(10) Patent No.: US 10,432,831 B2
(45) Date of Patent: Oct. 1, 2019

(54) IMAGE SENSOR

(71) Applicant: SK hynix Inc., Icheon-Si (KR)

(72) Inventor: Kyoung-In Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 114 days.

(21) Appl. No.: 15/824,979

(22) Filed: Nov. 28, 2017

(65) Prior Publication Data

US 2018/0255215 A1 Sep. 6, 2018

(30) Foreign Application Priority Data

Mar. 6, 2017 (KR) .................. 10-2017-0028056

(51) Int. Cl.
| | |
|---|---|
| *H04N 5/335* | (2011.01) |
| *H04N 5/225* | (2006.01) |
| *G02B 5/20* | (2006.01) |

(52) U.S. Cl.
CPC .......... *H04N 5/2253* (2013.01); *G02B 5/201* (2013.01); *H04N 5/2254* (2013.01)

(58) Field of Classification Search
CPC combination set(s) only.
See application file for complete search history.

(56) References Cited

U.S. PATENT DOCUMENTS

| | | | |
|---|---|---|---|
| 8,570,412 B2 | 10/2013 | Yanagita et al. | |
| 9,165,959 B2 * | 10/2015 | Chen | ................. H01L 27/14605 |
| 10,084,007 B2 * | 9/2018 | Lee | .................... H01L 27/14654 |
| 10,218,927 B2 * | 2/2019 | Kwag | .................... H04N 5/365 |

FOREIGN PATENT DOCUMENTS

KR  10-2017-0057990  5/2017

* cited by examiner

*Primary Examiner* — Gary C Vieaux
(74) *Attorney, Agent, or Firm* — Perkins Coie LLP

(57) ABSTRACT

Disclosed is an image sensor device including a pixel array in which a plurality of pixel blocks are arranged. Each of the pixel blocks may include: a light receiver comprising a floating diffusion and a plurality of unit pixels and configured to receive incident light and generate photo charges in response to the received incident light, the plurality of unit pixels sharing the floating diffusion; a first driver located at a first side of the light receiver and comprising a driver transistor; a second driver located at a second side of the light receiver and comprising a reset transistor; and a conductive line having a first region coupling the driver transistor to the floating diffusion and a second region coupling the floating diffusion to the reset transistor, wherein the driver transistor and the reset transistor are respectively located the first side and the second side of the light receiver in a diagonal direction.

22 Claims, 5 Drawing Sheets

IMAGE SENSOR

CROSS-REFERENCE TO RELATED APPLICATIONS

This patent document claims priority under 35 U.S.C. § 119 to Korean Patent Application No. 10-2017-0028056 filed on Mar. 6, 2017 in the Korean Intellectual Property Office, the disclosure of which is incorporated herein by reference in its entirety.

TECHNICAL FIELD

Exemplary embodiments of the present invention relate to a semiconductor device fabrication technology including an image sensor.

BACKGROUND

An image sensor refers to a device that converts an optical image into an electrical signal. Recently, with the development of computer industry and communication industry, the demand for an enhanced image sensor with a high integration density is increasing in various fields such as a digital camera, camcorder, PCS (Personal Communication System), game machine, security camera, medical micro-camera and robot.

SUMMARY

Various embodiments are directed to an enhanced image sensor.

In an embodiment, an image sensor device may include: a pixel array in which a plurality of pixel blocks are arranged. Each of the pixel blocks may include: a light receiver comprising a floating diffusion and a plurality of unit pixels and configured to receive incident light and generate photo charges in response to the received incident light, the plurality of unit pixels sharing the floating diffusion; a first driver located at a first side of the light receiver and comprising a driver transistor; a second driver located at a second side of the light receiver and comprising a reset transistor; and a conductive line having a first region coupling the driver transistor to the floating diffusion and a second region coupling the floating diffusion to the reset transistor, wherein the driver transistor and the reset transistor are respectively located the first side and the second side of the light receiver in a diagonal direction.

The first region of the conductive line and the second region of conductive line may have substantially the same length. The first and second regions of the conductive line may be symmetrical with respect to the floating diffusion.

The first driver may further include a selection transistor, and the selection transistor may be located closer to the floating diffusion than the driver transistor is. The selection transistor may be located on the substantially same line as the floating diffusion.

The first region of the conductive line may be electrically coupled to a gate of the driver transistor, and the second region of the conductive line may be electrically coupled to a source of the reset transistor. The reset transistor may have a gate located closer to an outside of the corresponding pixel block than the source of the reset transistor.

The plurality of unit pixels may include a first unit pixel adjacent to the driver transistor and a second unit pixel adjacent to the reset transistor, the first unit pixel and the second unit pixel configured to sense the same color.

In an embodiment, an image sensor device may include: a pixel array in which a plurality of pixel blocks are arranged. Each of the pixel blocks may include: a light receiver comprising a floating diffusion and first to fourth unit pixels sharing the floating diffusion, each of the first to fourth unit pixels configured to receive incident light and generate photo charges in response to the received incident light, wherein the first unit pixel located at a first upper side of the floating diffusion, a second unit pixel located at a second upper side of the floating diffusion, a third unit pixel located at a first lower side of the floating diffusion, and a fourth unit pixel located at a second lower side of the floating diffusion; a first driver located adjacent to the first unit pixel and comprising a driver transistor; a second driver located adjacent to the fourth unit pixel and comprising a reset transistor; and a conductive line having a first region coupling the driver transistor to the floating diffusion and a second region coupling the floating diffusion to the reset transistor.

The image sensor device may further include a color filter array with a plurality of color patterns corresponding to the plurality of pixel blocks, wherein each of the plurality of the color patterns comprises a first color filter corresponding to the first unit pixel, a second color filter corresponding to the second unit pixel, a third color filter corresponding to the third unit pixel and a fourth color filter corresponding to the fourth unit pixel, and the first and fourth color filters the same color. The first and fourth color filters may include a green filter.

The first region of the conductive line and the second region of the conductive line may have substantially the same length. The first and second regions of the conductive line may be symmetrical with respect to the floating diffusion. The driver transistor of the first driver may be located adjacent to the first unit pixel, and the reset transistor of the second driver may be located adjacent to the fourth unit pixel.

The first driver may further include a selection transistor, and the selection transistor may be located closer to the floating diffusion than the driver transistor is. The gate of the selection transistor may be located on the substantially same line as the floating diffusion.

The first region of the conductive line may be electrically coupled to a gate of the driver transistor, and the second region of the conductive line may be electrically coupled to a source of the reset transistor. The reset transistor may have a gate located closer to an outside of the corresponding pixel block than the source of the reset transistor.

In an embodiment, an image sensor device may include: a first pixel block may comprising: a first light receiver having a first floating diffusion and a plurality of unit pixels sharing the first floating diffusion, each of the plurality of unit pixels configured to receive incident light and generate photo charges in response to the received incident light; a first driver formed at the left top of the first light receiver; and a second driver formed at the right bottom of the first light receiver; and a second pixel block located adjacent to the first pixel block and comprising: a second light receiver having a second floating diffusion and a plurality of unit pixels sharing the second floating diffusion, each of the plurality of unit pixels configured to receive incident light and generate photo charges in response to the received incident light; a third driver formed at the left top of the second light receiver; and a fourth driver formed at the right bottom of the second light receiver, wherein the second and third drivers are located on the same line.

The image sensor device may further include: a first conductive line having a first region coupling the first driver transistor and the first floating diffusion and a second region coupling the first floating diffusion and the first reset transistor; and a second conductive line having a third region coupling the second driver transistor and the second floating diffusion and a fourth region coupling the second floating diffusion and the second reset transistor, wherein the first region and the second region have substantially the same length, and the third region and the fourth region have substantially the same length.

The first and third drivers may include first and second driver transistors, respectively, and the second and fourth drivers may include first and second reset transistors, respectively. The plurality of unit pixels of the first pixel block may include a first unit pixel adjacent to the first driver and a second unit pixel adjacent to the second driver and the plurality of unit pixels of the second pixel block may include a third unit pixel adjacent to the third driver and a fourth unit pixel adjacent to the fourth driver sense, the first to fourth unit pixel configured to sense the same color.

DETAILED DESCRIPTION

Figure 1:
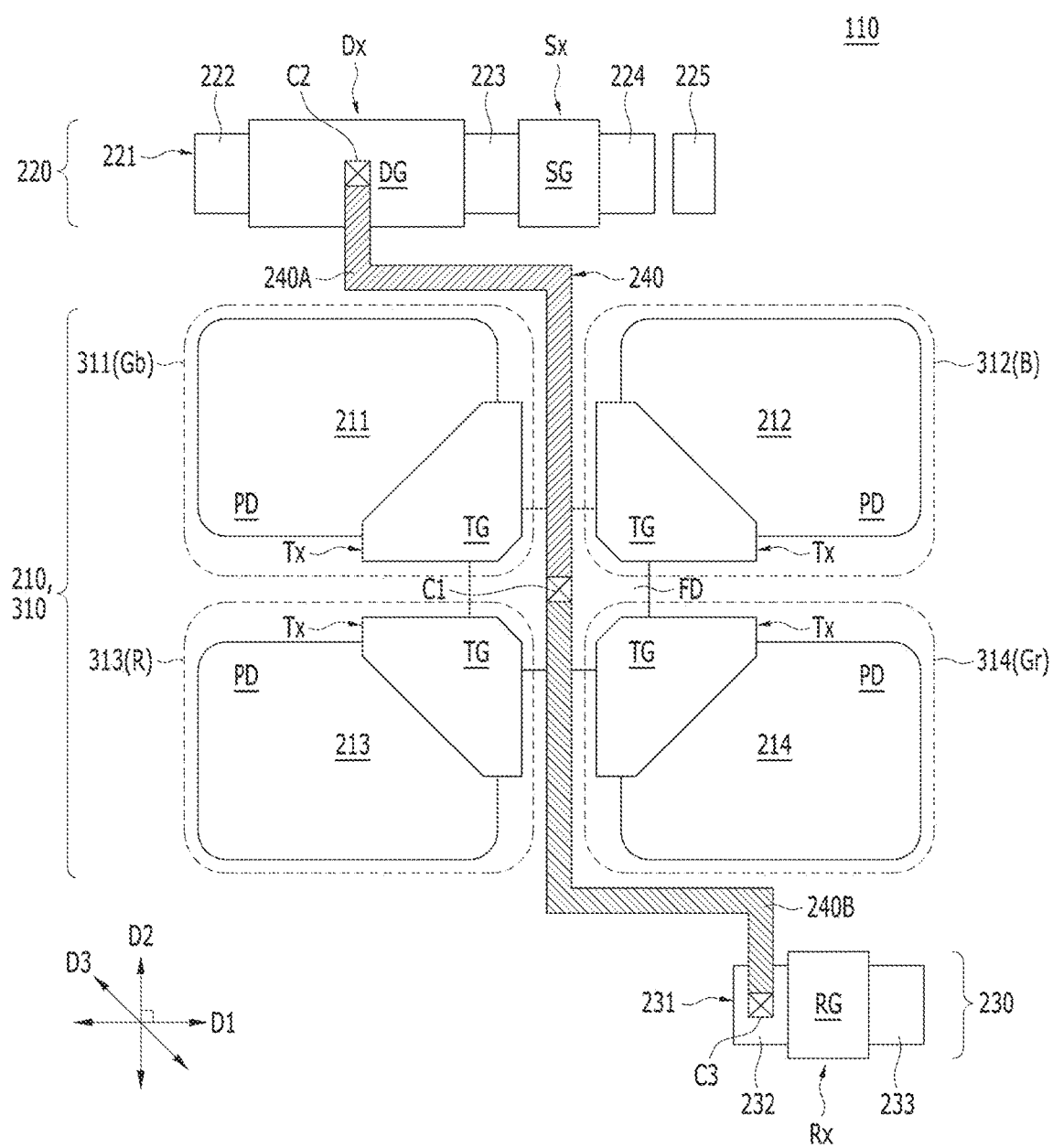
FIG. 1 is a plan view illustrating a pixel block of an image sensor based on an embodiment of the disclosed technology and a color pattern corresponding to the pixel block.

Various embodiments of the disclosed technology provide an enhanced image sensor. The enhanced image sensor may indicate an image sensor capable of providing a high-resolution image. For this operation, the image sensor may have a shared pixel structure. For example, the various embodiments provide an image sensor which includes a shared pixel structure for providing a high-resolution image, thereby preventing a difference between output signals of unit pixels. For reference, an image sensor which generates an image by sensing a red color, green color and blue color can minimize error and noise during image conversion, only when output signals of two or more unit pixels which are arranged adjacent to each other to sense the same color, for example, two green pixels adjacent to each other, have the same magnitude. In the image sensor with a shared pixel structure, however, structures arranged around the respective unit pixels, for example, pixel transistors, are different from each other. Thus, overlap capacitance or parasitic capacitance of each unit pixel becomes different from one another and the difference in overlap capacitance or parasitic capacitance causes the output signal of each unit pixel to become different from one another. The disclosed technology in this patent document provide various embodiments of an image sensor which includes a shared pixel structure for providing a high-resolution image, and is capable of preventing output signals of unit pixels from being different from one another. The various implementations of the disclosed technology provide an image sensor which can provide, for the unit pixels arranged adjacent to each other to sense the same color, the same overlap capacitances or parasitic capacitances among the unit pixels and structures adjacent to the unit pixels.

Various embodiments of the disclosed technology will be described below in more detail with reference to the accompanying drawings. The drawings may not be necessarily to scale and in some instances, proportions of at least some of structures in the drawings may have been exaggerated in order to clearly illustrate certain features of the described examples or implementations. In presenting a specific example in a drawing or description having two or more layers in a multi-layer structure, the relative positioning relationship of such layers or the sequence of arranging the layers as shown reflects a particular implementation for the described or illustrated example and a different relative positioning relationship or sequence of arranging the layers may be possible. In addition, a described or illustrated example of a multi-layer structure may not reflect all layers present in that particular multilayer structure (e.g., one or more additional layers may be present between two illustrated layers). As a specific example, when a first layer in a described or illustrated multi-layer structure is referred to as being "on" or "over" a second layer or "on" or "over" a substrate, the first layer may be directly formed on the second layer or the substrate but may also represent a structure where one or more other intermediate layers may exist between the first layer and the second layer or the substrate.

FIG. 1 is a plan view illustrating a pixel block of an image sensor and a color pattern corresponding to the pixel block based on an embodiment of the disclosed technology. For reference, the color pattern may include a plurality of color filters indicated by dotted lines in FIG. 1. In FIG. 1, a first direction D1 may be set to the row direction or horizontal direction, a second direction D2 may be set to the column direction or vertical direction, and a third direction D3 may be set to a diagonal direction.

As illustrated in FIG. 1, the image sensor based on the present embodiment of the disclosed technology may include a pixel block 110. The pixel block 110 may include a light receiver 210, a first driver 220, a second driver 230 and a conductive line 240. The light receiver 210 may include a plurality of unit pixels which generate photo charges in response to incident light and have a shared pixel structure. The first and second drivers 220 and 230 may be located at one side and the other side of the light receiver 210, respectively. For example, in FIG. 1, the first and second drivers 220 and 230 are respectively located at the top and bottom of the pixel block 110. The conductive line 240 may electrically couple the light receiver 210 to the first and second drivers 220 and 230. As one example, the embodiment shown in FIG. 1 shows that the pixel block 110 includes one receiver 210, but other implementations are also possible. For example, in other implementations, the pixel block 110 may include two or more light receivers 210, and the two or more light receivers 210 may share the first and second drivers 220 and 230.

The light receiver 210 may include the plurality of unit pixels which are arranged in a M*N matrix structure (M and N are natural numbers greater than 0). The unit pixels share a floating diffusion FD. For example, the light receiver 210 may have a 4-shared pixel structure including four unit pixels arranged in a 2×2 matrix structure, that is, first to fourth unit pixels 211 to 214. However, the present embodiment is not limited to the 4-shared pixel structure. For example, in other implementations, the light receiver 210 may have a $2^n$-shared pixel structure where n is a natural number greater than 0.

The floating diffusion FD may be located in the center of the light receiver 210, and the first to fourth unit pixels 211 to 214 may surround the floating diffusion FD. The first to fourth unit pixels 211 to 214 are arranged on the respective sides of the floating diffusion FD. For example, the first to fourth unit pixels 211 to 214 may be located at the left top, right top, left bottom and right bottom of the light receiver 210, respectively. Thus, the first unit pixel 211 may be adjacent to the first driver 220, and the fourth unit pixel 214 may be adjacent to the second driver 230. As will be further described later, the arrangement of the first to fourth unit pixels can help to prevent a difference between output signals of unit pixels which are arranged adjacent to each other to sense the same color.

Each of the first to fourth unit pixels 211 to 214 may include a photoelectric conversion element PD and a transfer transistor Tx. The photoelectric conversion element PD may generate a photo charge in response to incident light, and the transfer transistor Tx may transfer the photo charge generated by the photoelectric conversion element PD to the floating diffusion FD in response to a transfer signal. The photoelectric conversion element PD may include an organic or/and inorganic photodiode. The photoelectric conversion element PD may include any one of organic and inorganic photodiodes, or have a stacked structure of organic and inorganic photodiodes. The transfer signal may be applied to a transfer gate TG, and the photoelectric conversion element PD and the floating diffusion FD may serve as the source and drain of the transfer transistor Tx.

The first driver 220 may generate an output signal corresponding to the photo charge generated by the light receiver 210, and output the output signal to a column line (not illustrated) in response to a select signal applied through a row line (not illustrated). For this operation, the first driver 220 may include a driver transistor Dx and a selection transistor Sx. The driver transistor Dx and the selection transistor Sx may share a first active region 221, and include a driver gate DG and a selection gate SG, respectively. The driver gate DG may be electrically coupled to the floating diffusion FD through the conductive line 240, and the selection gate SG may be coupled to a row line (not illustrated). The first active region 221 includes first to third junction regions 222, 223 and 224. The junction regions (source and drain) may be formed at both sides of the driver gate DG and the selection gate SG. For example, the first junction region 222 of the first active region 221 may be formed at one side of the driver gate DG, a second junction region 223 of the first active region 221 may be formed at the other side of the driver gate DG, that is, between the driver gate DG and the selection gate SG, and a third junction region 224 of the first active region 221 may be formed at the other side of the selection gate SG that is opposite to the second junction region 223. Although not illustrated in FIG. 1, the first junction region 222 may operate as the drain of the driver transistor Dx, and coupled to a supply voltage terminal. The third junction region 224 may operate as the source of the selection transistor Sx, and coupled to a column line (not illustrated).

The first driver 220 and the second driver 230 may be located at different sides of the light receiver 210 from each other in first and second directions D1 and D2. For example, the first driver 220 may be located at the left top of the light receiver 210. The first active region 221 may include major and minor axes, and have a bar shape of which the major axis is extended in the first direction D1. In the first direction D1, the driver gate DG may have a line width or channel length greater than the selection gate SG. Such design of the driver gate DG helps to effectively prevent an occurrence of noise when an output signal is generated. In the pixel block 110, the driver gate DG may be located closer to an external area of the pixel block 110 than the selection gate SG is. As compared to the selection gate SG, the driver gate DG is located further away from a center along the first direction D1. In other words, the selection transistor Sx is located closer to the floating diffusion FD than the driver transistor Dx is. Referring to FIG. 1, when the first unit pixel 211 and the second unit pixels 212 are arranged in the first direction D1, the driver gate DG may be arranged closer to the first unit pixel 211 than the second unit pixel 212 and the selection gate SG may be arranged between the first unit pixel 211 and the second unit pixel 212. For example, the driver gate DG may be located at the left side of the selection gate SG. As will be described later, the structure in which the driver gate DG is arranged closer to the first unit pixel 211 than the selection gate SG is can serve to prevent a difference between output signals that may be caused by the conductive line 240. Furthermore, as the driver gate DG is arranged closer to the first unit pixel 211 than the selection gate SG is, the selection gate SG can be located on the same line as the floating diffusion FD in the second direction D2. Such a structure can prevent a difference between output signals that may be caused by the selection transistor Sx.

The first driver 220 may further include a pickup region 225. The pickup region 225 may be located around or in parallel to the first active region 221 while being separated a predetermined distance from the first active region 221 in the first direction D1. The pickup region 225 may provide a predetermined bias, for example, ground voltage, to a substrate in which the light receiver 210 and the first and second drivers 220 and 230 are formed. Thus, the pickup region 225 can improve the operation characteristic of the image sensor.

The second driver 230 may reset the floating diffusion FD of the light receiver 210 in response to a reset signal. For this operation, the second driver 230 may include a reset transistor Rx. The reset transistor Rx may include a second active region 231. The second active region 230 may include a reset gate RG and fourth and fifth junction regions 232 and 233. The fourth and fifth junction regions 232 and 233 may be formed at both sides of the reset gate RG. The reset signal may be applied to the reset gate RG. The fourth junction region 232 may be set to the source of the reset transistor Rx, and electrically coupled to the floating diffusion FD through the conductive line 240. Although not illustrated in FIG. 1, the fifth junction region 233 may be set to the drain of the reset transistor Rx, and coupled to the supply voltage terminal.

The second driver 230 may be located at the different side of the light receiver 210 from the first driver 220 in first and second directions D1 and D2. For example, the second driver 230 may be located at the right bottom of the light receiver 210. Therefore, the first and second drivers 220 and 230 may be arranged in the third direction D3, with the light receiver 210 provided therebetween. The second active region 231 may include major and minor axes, and have a bar shape of which the major axis is extended in the first direction D1. In the pixel block 110, the reset gate RG may be located closer to an external area of the pixel block 110 than the conductive line 240 or the fourth junction region 232 is. As compared to the conductive line 240 or the fourth junction region 232, the reset gate RG is located further away from a center along the first direction D1. In FIG. 1, when the third unit pixel 213 and the fourth unit pixels 214 are arranged in the first direction D1, the reset gate RG may be arranged closer to the fourth unit pixel 214 than the third unit pixel 213. For example, the reset gate RG may be located at the right side of the conductive line 240. As will be described later, the structure in which the reset gate RG is arranged closer to the fourth unit pixel 214 than the third unit pixel 213 can serve to prevent a difference between output signals that may be caused by the conductive line 240.

The conductive line 240 may serve to electrically couple the light receiver 210 to the first and second drivers 220 and 230. For example, the conductive line 240 may be electrically coupled to the floating diffusion FD of the light receiver 210 through a first contact C1, electrically coupled to the driver gate DG of the first driver 220 through a second contact C2, and electrically coupled to the second driver 230 through a third contact C3. In some implementations, the conductive line 240 may be electrically coupled to the source of the reset transistor Rx of the second driver, for example, the fourth junction region 232 through a third contact C3.

The conductive line 240 may include a first region 240A and a second region 240B. The first region 240A of the conductive line 240 may correspond to the portion of the conductive line 240 extending from the first contact C1 to the second contact C2, and the second region 240B of the conductive line 240 may correspond to the portion of the conductive line 240 extending from the first contact C1 to the third contact C3. The first region 240A may electrically couple the floating diffusion FD of the light receiver 210 to the driver gate DG of the first driver 220, and the second region 240B may electrically couple the floating diffusion FD of the light receiver 210 to the fourth junction region 232 of the second driver 230. At this time, the first region 240A of the conductive line 240 and the second region 240B of the conductive line 240 may have substantially the same length in order to prevent a difference between output signals, which may be caused by the conductive line 240. Furthermore, the first region 240A of the conductive line 240 and the second region 240B of the conductive line 240 may have substantially the same or similar shape around the first contact C1. For example, the first region 240A of the conductive line 240 and the second region 240B of the conductive line 240 may have a point symmetry with each other, based on the first contact C1 or the floating diffusion FD. In some implementations, the first and second regions 240A and 240B of the conductive line 240 are spatially separated and located on two different sides of the floating diffusion FD, respectively. Hence, when the first region 240A of the conductive line 240 is rotated 180 degrees based on the first contact C1, the second region 240B of the conductive line 240 and the first region 240A of the conductive line 240 may overlap each other. At this time, since the first region 240A of the conductive line 240 and the second region 240B of the conductive line 240 have substantially the same length and shape, the distances between the floating diffusion FD and the first driver 220 or the second driver 230 can be minimized, which makes it possible to minimize the whole overlap capacitance caused by the conductive line 240. Such a structure can minimize the effective capacitance of the floating diffusion FD while improving a conversion gain.

The color pattern 310 of the pixel block 110 may include a plurality of color filters corresponding to the respective unit pixels in the pixel block 110. For example, the color pattern 310 may include first to fourth color filters 311 to 314. Each of the color filters may be implemented with a single filter, for example, a red filter, a green filter, a blue filter, a cyan filter, a yellow filter, a magenta filter, a white filter, a black filter, an IR cutoff filter, an IR pass filter, or a band pass filter for passing a specific wavelength band, or a multi-filter including two or more filters thereof.

Among the plurality of color filters in the color pattern 310, two or color filters may have the same color. For example, when the pixel block 110 includes the first to fourth unit pixels 211 to 214, the color pattern 310 may include first to fourth color filters 311 to 314 corresponding to the first to fourth unit pixels 211 to 214, respectively. Assume that among the first to fourth color filters 311 to 314, two color filters may have the same color. For example, the color pattern 310 may include a Bayer pattern in which BGb/RGr are repeated. In some implementations, the first color filter 311, the second color filter 312, the third color filter 313 and the fourth color filter 314 may be set to a first green filter Gb, a blue filter B, a red filter R and a second green filter Gr, respectively. Thus, the first color filter 311 and the fourth color filter 314 have the same color when the first color filter 311 and the fourth color filter 314 correspond to the first unit pixel 211 adjacent to the first driver 220 and the fourth unit pixel 214 adjacent to the second driver 230, respectively. Such arrangement of the color filters allows the unit pixels that are closest to the first or second driver 220 or 230 to have the same color each other. Since the color filters of the unit pixels, which are the most proximate to the first and second drivers 220 and 230, have the same color, error and noise of an image sensor can be minimized during image conversion.

In the image sensor based on the present embodiment of the disclosed technology, the first and second drivers 220 and 230 are located at different sides of the light receiver 210, and the conductive line 240 includes the first region 240A and the second region 240B that have substantially the same length and shape. By doing so, the distances between the floating diffusion FD and the first driver 220 and between the floating diffusion and the second drivers 230 and 230 can be minimized, and thus it is possible to prevent a difference between output signals of the unit pixels having the shared pixel structure.

Furthermore, since the unit pixels adjacent to the first and second drivers 220 and 230 include the color filters having the same color, the image sensor can prevent a difference between output signals of the unit pixels for sensing the same color, thereby minimizing error and noise during image conversion.

Figure 2:
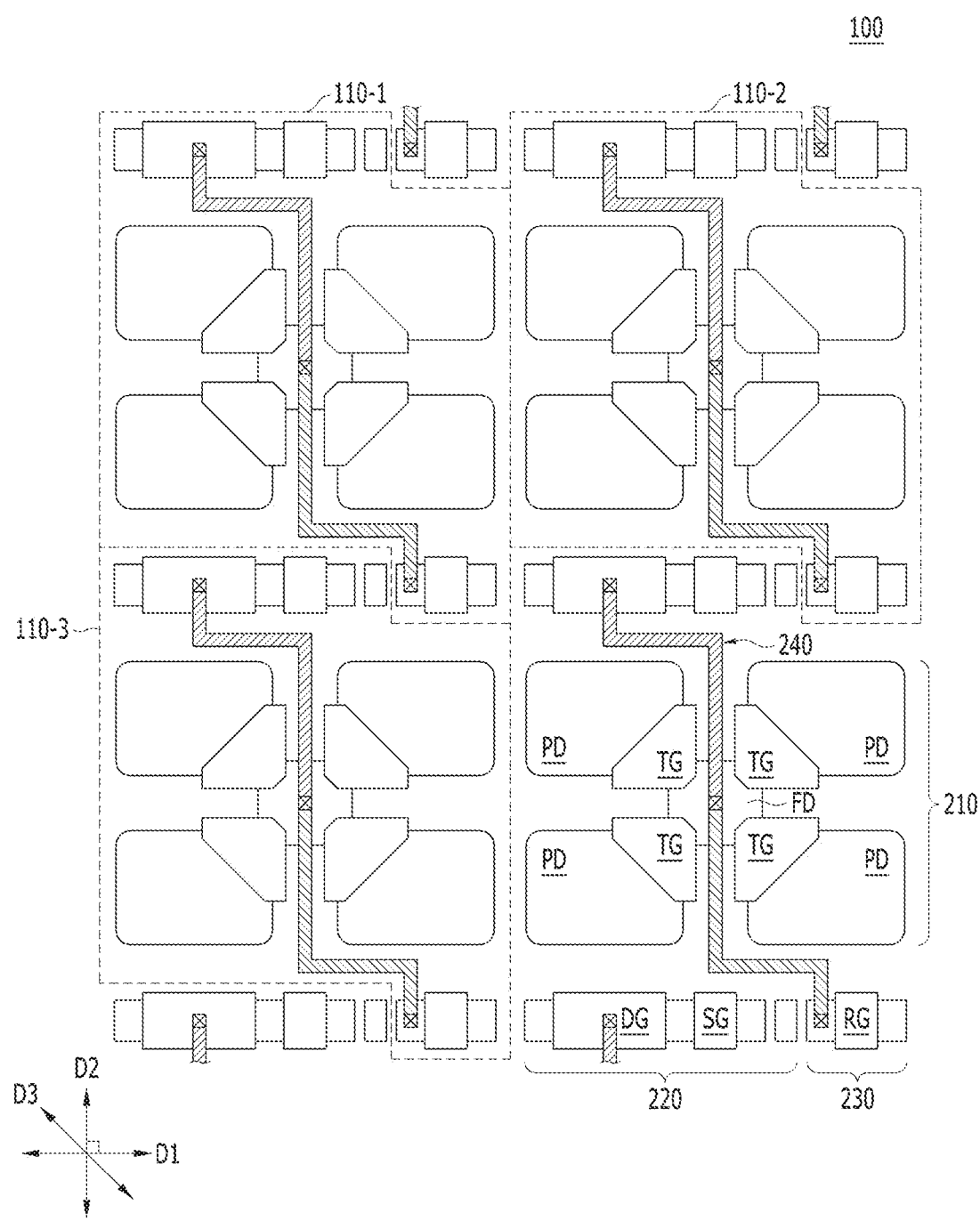
FIG. 2 is a plan view illustrating a part of a pixel array of an image sensor based on an embodiment of the disclosed technology.
Figure 3:
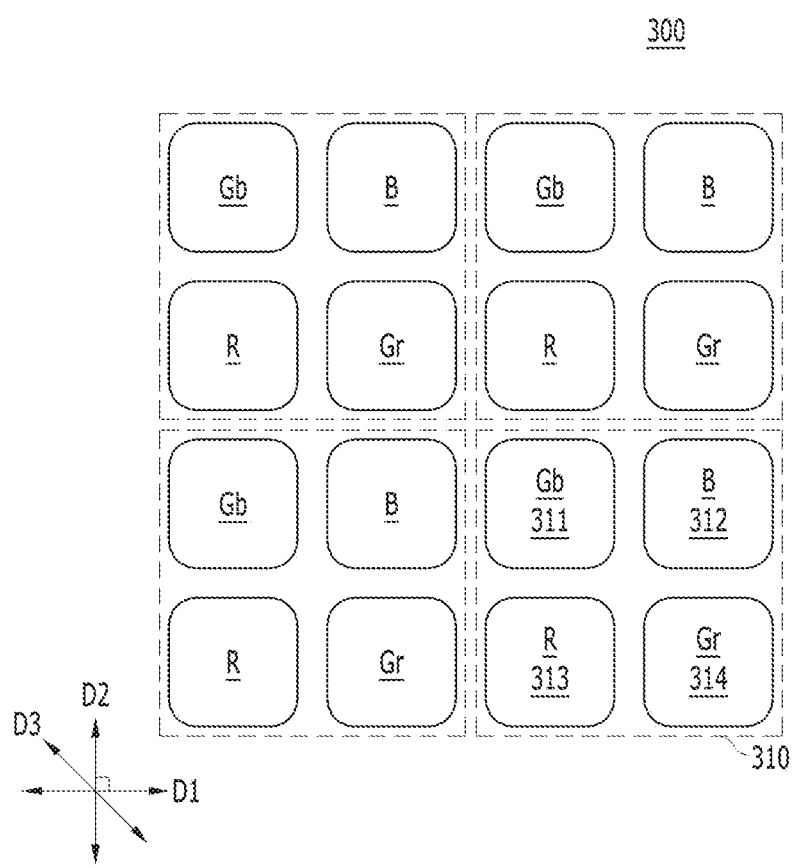
FIG. 3 is a plan view illustrating a color filter array corresponding to a part of a pixel array of an image sensor based on an embodiment of the disclosed technology.

FIG. 2 is a plan view illustrating a part of a pixel array of the image sensor based on the present embodiment of the disclosed technology, and FIG. 3 is a plan view illustrating a part of a color filter array, which corresponds to the part of the pixel array of the image sensor based on the present embodiment of the disclosed technology. In FIGS. 2 and 3, the first direction D1 may be set to the row direction or horizontal direction, the second direction D2 may be set to the column direction or vertical direction, and the third direction D3 may be set to a diagonal direction.

As illustrated in FIGS. 2 and 3, the image sensor based on the present embodiment of the disclosed technology may include a pixel array 100 in which a plurality of pixel blocks 110 are two-dimensionally arranged. Each of the pixel blocks 110 may include a light receiver 210, a first driver 220, a second driver 230 and a conductive line 240. The light receiver 210 may include a plurality of unit pixels which generate photo charges in response to incident light and have a shared pixel structure, the first and second drivers 220 and 230 may be located at different sides of the receiver 210 in the second direction D2, and the conductive line 240 may electrically couple the light receiver 210 to the first and second drivers 220 and 230. Since the pixel block 110 has been described in detail with reference to FIG. 1, the detailed descriptions thereof are omitted herein.

In FIG. 2, the pixel array 100 includes multiple pixel blocks. In the first direction, the pixel array 100 may include a pixel block (hereafter, referred to as 'first pixel block 110-1') and another pixel block (hereafter, referred to as 'second pixel block 110-2') adjacent to the first pixel block. In the first direction D1, the light receiver 210 and the first and second drivers 220 and 230 of the first pixel block 110-1 may be located on the same lines as the light receiver 210 and the first and second drivers 220 and 230 of the second pixel block 110-2, respectively.

In the second direction, the pixel array 100 may include the first pixel block 110-1 and another pixel block (hereafter, referred to as 'third pixel block 110-3') adjacent to the first pixel block 110-1. The second driver 230 of the first pixel block 110-1 and the first driver 220 of the third pixel block 110-3 may be located on the same line in the first direction D1.

Referring to FIG. 3, the color filter array 300 may include a plurality of color patterns 310 which are two dimensionally arranged so as to correspond to the respective pixel blocks 110. Each of the color patterns 310 may include first to fourth color filters 311 to 314 in the same arrangement.

As described above, the pixel array 100 of the image sensor based on the present embodiment of the disclosed technology has the arrangement in which the second driver 230 of the first pixel block 110-1 and the first driver 220 of the third pixel block 110-3 are located on the same line in the first direction D1. Thus, the image sensor based on the present embodiment of the disclosed technology can be easily integrated at high density, and more effectively preventing a difference between output signals of the plurality of unit pixels having the shared pixel structure.

Figure 4:
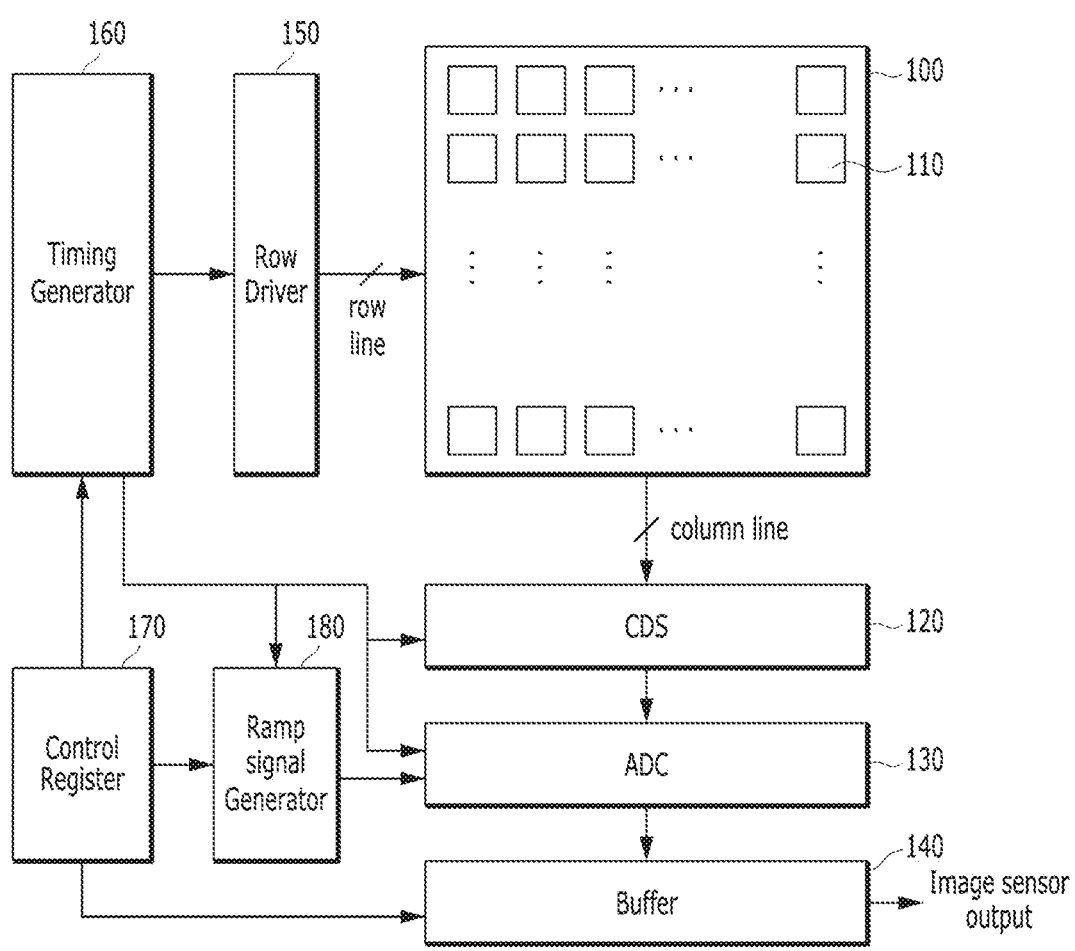
FIG. 4 is a block diagram schematically illustrating a representation of an example of an image sensor based on an embodiment of the disclosed technology.

FIG. 4 is a block diagram schematically illustrating a representation of an example of an image sensor based on an embodiment of the disclosed technology.

As shown in FIG. 4, the image sensor may include a pixel array 100 in which a plurality of pixel blocks 110 are arranged in a matrix structure, a correlated double sampling (CDS) 120, an analog-digital converter (ADC) 130, a buffer 140, a row driver 150, a timing generator 160, a control register 170, and a ramp signal generator 180. Each of the plurality of pixel blocks 110 may have a 4-shared pixel structure.

The timing generator 160 generates one or more control signals for controlling the respective operations of the row driver 150, the correlated double sampling (CDS) 120, the analog-digital converter (ADC) 130 and the ramp signal generator 180. The control register 170 generates one or more control signals for controlling the respective operations of the ramp signal generator 180, the timing generator 160 and the buffer 140.

The row driver 150 is coupled to the pixel array 100 through a row line. The row driver 150 drives the pixel array 100 with the row line. For example, the row driver 150 may generate a select signal for selecting a particular row line among a plurality of row lines. The plurality of row lines are coupled with the plurality of pixel blocks 110, respectively. One row line is coupled to each of the plurality of pixel blocks 110.

Each of the plurality of pixel blocks 110 senses incident light, and outputs an image reset signal and an image signal to the correlated double sampling 120 through a column line. To receive the image reset signal and the image signal from the pixel blocks 110 in the pixel array 100, the correlated double sampling 120 is coupled to the pixel array 100 through column lines. The correlated double sampling 120 performs sampling for each of the image reset signal and the image signal received therein. The plurality of pixel blocks 110 are coupled to a plurality of column lines, respectively. One column line is coupled to each of the plurality of pixel blocks 110. The analog-digital converter 130 is coupled with the correlated double sampling 120 and the ramp signal generator 180. The analog-digital converter 130 is configured to receive a sampling signal and a ramp signal from the correlated double sampling 120 and the ramp signal generator 180, respectively, compare the ramp signal which is outputted from the ramp signal generator 180 with the sampling signal which is outputted from the correlated double sampling 120, and output a comparison signal. In some implementations, the analog-digital converter 130 is coupled to the timing generator 160 which provides a clock signal to the analog-digital converter 130. The analog-digital converter 130 counts a level transition time of the comparison signal using a clock signal which is provided from the timing generator 160, and outputs a count value to the buffer 140. In some implementations, the timing generator is further coupled to the ram signal generator 180 and the ramp signal generator 180 may operate under control of the timing generator 160.

The buffer 140 is coupled to the analog-digital converter 130 to receive digital signals from the analog-digital converter 130. In some implementations, the buffer 140 may include a memory (not shown) and a sense amplifier (not shown). The buffer 140 stores digital signals which are outputted from the analog-digital converter 130. In some implementations, the memory of the buffer stores the count values that are counted by and provided from the analog-digital converter 130. The count values may be associated with the signals outputted from the plurality of pixel groups 110. The buffer 140 is further configured to sense and amplify the stored digital signals, and outputs the amplified resultant signals. The sense amplifier of the buffer 140 is structured to sense and amplify the respective count values which are outputted from the memory.

The image sensor based on the above-described embodiments of the disclosed technology may be used in various electronic devices or systems. Hereafter, a case in which the image sensor based on the embodiments of the disclosed technology is applied to a camera will be described with reference to FIG. 5.

Figure 5:
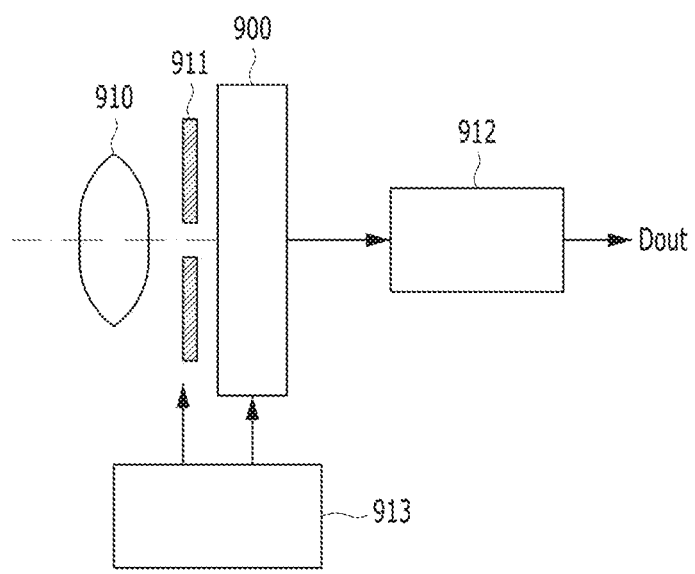
FIG. 5 is a diagram schematically illustrating a representation of an example of an electronic device including an image sensor based on an embodiment of the disclosed technology.

FIG. 5 is a diagram schematically illustrating a representation of an example of an electronic device including the image sensor based on an embodiment of the disclosed technology.

Referring to FIG. 5, the electronic device including the image sensor based on the embodiment of the disclosed technology may be a camera capable of taking a still image or a moving picture. The electronic device may include an optical system (or optical lens) 910, a shutter unit 911, an image sensor 900, a driving unit 913 for controlling/driving the image sensor 900 and the shutter unit 911, and a signal processing unit 912.

The optical system 910 guides image light (incident light) from an object, to a pixel array (see the reference numeral 100 of FIG. 4) of the image sensor 900. The optical system 910 may be constructed by a plurality of optical lenses. The shutter unit 911 controls a light irradiation period and a light shielding period for the image sensor 900. The driving unit 913 controls the transmission operation of the image sensor 900 and the shutter operation of the shutter unit 911. The signal processing unit 912 performs various kinds of signal processing for the signal outputted from the image sensor 900. An image signal Dout after signal processing may be stored in a storage medium such as a memory or be outputted to a monitor or the like.

Based on the present embodiment, the first and second drivers may be located at one side and the other side of the light receiver, and the first region of the conductive line and the second region of the conductive line may have substantially the same length and shape. With the structure suggested in this patent document, it is possible to prevent a difference between output signals of the plurality of unit pixels having the shared pixel structure.

Furthermore, the unit pixels adjacent to the first and second drivers may include the color filters having the same color, thereby preventing a difference between output signals of unit pixels for sensing the same color while minimizing error and noise during image conversion.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve described results. Moreover, the separation of various system components in the embodiments described in this patent document should not be understood as requiring such separation in all embodiments. Only a few implementations and examples are described. Other implementations, enhancements and variations can be made based on what is described and illustrated in this patent document.

What is claimed is:

1. An image sensor device comprising:
a pixel array in which a plurality of pixel blocks are arranged,
wherein each of the pixel blocks comprises:
a light receiver comprising a floating diffusion and a plurality of unit pixels and configured to receive incident light and generate photo charges in response to the received incident light, the plurality of unit pixels sharing the floating diffusion;
a first driver located at a first side of the light receiver and comprising a driver transistor;
a second driver located at a second side of the light receiver and comprising a reset transistor; and
a conductive line having a first region coupling the driver transistor to the floating diffusion and a second region coupling the floating diffusion to the reset transistor,
wherein the driver transistor and the reset transistor are respectively located the first side and the second side of the light receiver in a diagonal direction.

2. The image sensor device of claim 1, wherein the first region of the conductive line and the second region of the conductive line have substantially the same length.

3. The image sensor device of claim 1, wherein the first and second regions of the conductive line are symmetrical with respect to the floating diffusion.

4. The image sensor device of claim 1, wherein the first driver further comprises a selection transistor, and
the selection transistor is located closer to the floating diffusion than the driver transistor is.

5. The image sensor device of claim 4, wherein the selection transistor is located on the substantially same line as the floating diffusion.

6. The image sensor device of claim 1, wherein the first region of the conductive line is electrically coupled to a gate of the driver transistor, and
the second region of the conductive line is electrically coupled to a source of the reset transistor.

7. The image sensor device of claim 6, wherein the reset transistor has a gate located closer to an outside of the corresponding pixel block than the source of the reset transistor.

8. The image sensor device of claim 1, wherein the plurality of unit pixels include a first unit pixel adjacent to the driver transistor and a second unit pixel adjacent to the reset transistor, the first unit pixel and the second unit pixel configured to sense the same color.

9. An image sensor device comprising:
a pixel array in which a plurality of pixel blocks are arranged,
wherein each of the pixel blocks comprises:
a light receiver comprising a floating diffusion and first to fourth unit pixels sharing the floating diffusion, each of the first to fourth unit pixels configured to receive incident light and generate photo charges in response to the received incident light, wherein the first unit pixel located at a first upper side of the floating diffusion, a second unit pixel located at a second upper side of the floating diffusion, a third unit pixel located at a first lower side of the floating diffusion, and a fourth unit pixel located at a second lower side of the floating diffusion;
a first driver located adjacent to the first unit pixel and comprising a driver transistor;
a second driver located adjacent to the fourth unit pixel and comprising a reset transistor; and
a conductive line having a first region coupling the driver transistor to the floating diffusion and a second region coupling the floating diffusion to the reset transistor.

10. The image sensor device of claim 9, further comprising a color filter array with a plurality of color patterns corresponding to the plurality of pixel blocks,
wherein each of the plurality of the color patterns comprises a first color filter corresponding to the first unit pixel, a second color filter corresponding to the second unit pixel, a third color filter corresponding to the third unit pixel and a fourth color filter corresponding to the fourth unit pixel, and the first and fourth color filters the same color.

11. The image sensor device of claim 10, wherein the first and fourth color filters comprise a green filter.

12. The image sensor device of claim 9, wherein the first region of the conductive line and the second region of the conductive line have substantially the same length.

13. The image sensor device of claim 9, wherein the first and second regions of the conductive line are symmetrical with respect to the floating diffusion.

14. The image sensor device of claim 9, wherein the driver transistor of the first driver is located adjacent to the first unit pixel, and
the reset transistor of the second driver is located adjacent to the fourth unit pixel.

15. The image sensor device of claim 9, wherein the first driver further comprises a selection transistor, and
the selection transistor is located closer to the floating diffusion than the driver transistor is.

16. The image sensor device of claim 15, wherein the gate of the selection transistor is located on the substantially same line as the floating diffusion.

17. The image sensor device of claim 9, wherein the first region of the conductive line is electrically coupled to a gate of the driver transistor, and
the second region of the conductive line is electrically coupled to a source of the reset transistor.

18. The image sensor device of claim 17, wherein the reset transistor has a gate located closer to an outside of the corresponding pixel block than the source of the reset transistor.

19. An image sensor device comprising:
a first pixel block comprising: a first light receiver having a first floating diffusion and a plurality of unit pixels sharing the first floating diffusion, each of the plurality of unit pixels configured to receive incident light and generate photo charges in response to the received incident light; a first driver formed at the left top of the first light receiver; and a second driver formed at the right bottom of the first light receiver; and a second pixel block located adjacent to the first pixel block and comprising: a second light receiver having a second floating diffusion and a plurality of unit pixels sharing the second floating diffusion, each of the plurality of unit pixels configured to receive incident light and generate photo charges in response to the received incident light; a third driver formed at the left top of the second light receiver; and a fourth driver formed at the right bottom of the second light receiver,
wherein the second and third drivers are located on the same line.

20. The image sensor device of claim 19, wherein the first and third drivers comprise first and second driver transistors, respectively, and
the second and fourth drivers comprise first and second reset transistors, respectively.

21. The image sensor device of claim 20, further comprising:
a first conductive line having a first region coupling the first driver transistor and the first floating diffusion and a second region coupling the first floating diffusion and the first reset transistor; and
a second conductive line having a third region coupling the second driver transistor and the second floating diffusion and a fourth region coupling the second floating diffusion and the second reset transistor,
wherein the first region and the second region have substantially the same length, and the third region and the fourth region have substantially the same length.

22. The image sensor device of claim 19, wherein the plurality of unit pixels of the first pixel block include a first unit pixel adjacent to the first driver and a second unit pixel adjacent to the second driver and the plurality of unit pixels of the second pixel block includes a third unit pixel adjacent to the third driver and a fourth unit pixel adjacent to the fourth driver sense, the first to fourth unit pixel configured to sense the same color.

* * * * *